United States Patent
Aulin et al.

(10) Patent No.: US 12,264,731 B2
(45) Date of Patent: Apr. 1, 2025

(54) TORQUE VECTORING DEVICE, AND A DRIVE AXLE FOR A VEHICLE WITH A TORQUE VECTORING DEVICE

(71) Applicant: BorgWarner Sweden AB, Landskrona (SE)

(72) Inventors: Hans Aulin, Lomma (SE); Isak Andersson, Kvidinge (SE); Ted Brink, Flyinge (SE)

(73) Assignee: BORGWARNER SWEDEN AB (SE)

( * ) Notice: Subject to any disclaimer, the term of this patent is extended or adjusted under 35 U.S.C. 154(b) by 0 days.

(21) Appl. No.: 18/564,157

(22) PCT Filed: May 28, 2022

(86) PCT No.: PCT/EP2022/064506
§ 371 (c)(1),
(2) Date: Nov. 27, 2023

(87) PCT Pub. No.: WO2022/248731
PCT Pub. Date: Dec. 1, 2022

(65) Prior Publication Data
US 2024/0263692 A1      Aug. 8, 2024

(30) Foreign Application Priority Data
May 28, 2021   (SE) .................................. 2150685-2

(51) Int. Cl.
*F16H 48/36*     (2012.01)
*F16H 48/08*     (2006.01)
*F16H 48/10*     (2012.01)

(52) U.S. Cl.
CPC ............. *F16H 48/36* (2013.01); *F16H 48/08* (2013.01); *F16H 48/10* (2013.01); *F16H 2048/364* (2013.01)

(58) Field of Classification Search
CPC ........................... F16H 2048/364; F16H 48/36
See application file for complete search history.

(56) References Cited

U.S. PATENT DOCUMENTS 5,387,161 A * 2/1995 Shibahata ............... F16H 48/30
475/221
9,958,049 B1   5/2018 Sten et al.
(Continued)

FOREIGN PATENT DOCUMENTS

DE   102006050599 A1   4/2008
DE   102014103485 A1   9/2014
(Continued)

*Primary Examiner* — Sherry L Estremsky
(74) *Attorney, Agent, or Firm* — Dilworth IP, LLC

(57) ABSTRACT

A torque vectoring device for a drive axle of a vehicle including an electric torque vectoring motor, a planetary gear and a layshaft being configured to be coupled to a cage of a differential gear, the planetary gear including a first output being configured to be coupled to one of a left or right wheel drive shaft and a second output being coupled to the layshaft. The torque vectoring motor is forming a first torque flow path with the planetary gear and the layshaft and a second torque flow path with the first output of the planetary gear, wherein the first torque flow path and the second torque flow path are kinematically arranged in parallel. The layshaft is arranged eccentric with the first output of the planetary gear.

16 Claims, 7 Drawing Sheets

(56) References Cited

U.S. PATENT DOCUMENTS

| | | | |
|---|---|---|---|
| 10,030,755 B2* | 7/2018 | Severinsson | B60K 6/52 |
| 10,569,647 B2* | 2/2020 | Yamamura | B60K 17/356 |
| 2016/0003337 A1 | 1/2016 | Smetana | |
| 2019/0072168 A1 | 3/2019 | Yamamura | |

FOREIGN PATENT DOCUMENTS

| | | |
|---|---|---|
| EP | 3372430 A1 | 9/2018 |
| GB | 2466975 A | 7/2010 |
| JP | 2006046495 A | 2/2006 |
| JP | 2007298138 A | 11/2007 |
| JP | 2008089075 A | 4/2008 |
| JP | WO2020179202 A1 | 12/2021 |
| WO | 2015169837 A1 | 11/2015 |
| WO | 2017072329 A1 | 5/2017 |
| WO | 2019197285 A1 | 10/2019 |

* cited by examiner

TORQUE VECTORING DEVICE, AND A DRIVE AXLE FOR A VEHICLE WITH A TORQUE VECTORING DEVICE

TECHNICAL FIELD

The present invention relates to a torque vectoring device, through which traction torque supplied by a traction motor and transmitted to wheel drive shafts of the drive axle can be modified. The present invention further relates to a drive axle for a vehicle with such torque vectoring device.

BACKGROUND

In land vehicles, such as cars, it is commonly known to freely distribute traction torque, also referred to a drive torque, to different wheels in order to enhance the driving dynamics of the vehicle. Devices for accomplishing this are referred to as torque vectoring devices in the art. Torque vectoring devices are often used in two-wheel drive vehicles or four-wheel drive vehicles.

However, the required technical systems enhance the size, weight and costs of the respective drive axle of the vehicle.

In view of this, an improved torque vectoring device and a drive axle with a torque vectoring function are required.

SUMMARY

Accordingly, the objective underlying the invention disclosed herein is to provide a torque vectoring device, as well as a drive axle for a vehicle with a torque vectoring function that can be realized at low technical effort and that spares on physical structure, assembly space, weight and costs. Moreover, there should be a high design flexibility for efficient allocation of the assembly space.

This objective is achieved by the technical subject matter of the independent claims. Preferred embodiments of the invention can be gained from the dependent claims and the description.

According to a first aspect, a torque vectoring device for a drive axle of a vehicle is provided. The torque vectoring device comprises an electric torque vectoring motor, a planetary gear, and a layshaft being configured to be coupled to a cage of an associated differential gear. The planetary gear comprises a first output being configured to be coupled to one of a left or right wheel drive shaft and a second output being coupled to the layshaft. The torque vectoring motor is forming a first torque flow path with said planetary gear and said layshaft and a second torque flow path with the first output of said planetary gear, wherein said first torque flow path and said second torque flow path are kinematically arranged in parallel. The layshaft is arranged eccentric with the first output of the planetary gear.

The configuration of the torque vectoring device allows the planetary gear to be arranged concentrically with the left or right wheel drive shaft, whereby the layshaft is arranged axially displaced from the central axis of the planetary gear. Hence, compact mounting of the torque vectoring device is facilitated. Further, the provision of a layshaft allows flexibility in positioning and design of the planetary gear, as the layshaft is used not only for a gear reduction of the planetary gear output, but also to bridge the axial distance between the planetary gear and the cage of the differential cage.

In use the planetary gear may be arranged concentric with said wheel drive shafts, while the layshaft is axially arranged off said wheel drive shafts.

The torque vectoring motor may be coupled to a sun gear of the planetary gear, while a planet carrier is configured to be coupled to said left or right wheel drive shaft. The layshaft is coupled to a ring gear of the planetary gear. Hence, the sun gear forms an input for the planetary gear. The planet carrier forms the first output of the planetary gear while the ring gear forms the second output of the planetary gear.

Optionally, the torque vectoring motor is coupled to a sun gear of the planetary gear, while a ring gear is configured to be coupled to said left or right wheel drive shaft, and the layshaft is coupled to a planet carrier of the planetary gear. In such embodiment the ring gear forms the first output of the planetary gear while the planet carrier forms the second output of the planetary gear.

According to a second aspect a drive axle for a vehicle is provided. The drive axle comprises a differential gear with a cage and with a left wheel drive shaft and a right wheel drive shaft extending from said differential gear, and a torque vectoring device according to the first aspect.

The drive axle may further comprise an electric traction motor coupled to the cage of the differential gear. The torque vectoring motor and/or the traction motor may be arranged concentric with the wheel drive shafts.

According to a third aspect a vehicle is provided. The vehicle comprises at least one drive axle according to the second aspect.

A fourth aspect of the invention refers to a drive axle for a vehicle, comprising a differential gear with a cage and an electric traction motor coupled to said cage and with a left wheel drive shaft and a right wheel drive shaft extending from said differential gear, further comprising a torque vectoring device with an electric torque vectoring motor, a planetary gear and a layshaft, said planetary gear being coupled to one of said left or right wheel drive shafts and said layshaft being coupled to said cage, wherein said torque vectoring motor is forming a first torque flow path with said planetary gear, layshaft and cage and a second torque flow path with said planetary gear and said one left or right wheel drive shaft and wherein said first torque flow path and said second torque flow path are kinematically arranged in parallel.

In other words, being applicable for all four aspects, the torque vectoring device is adapted to selectively apply additional torque to the cage via the planetary gear and the layshaft in the first torque flow path. On the one hand, said additional torque supplied to the cage is uniformly passed on to said left wheel drive shaft and a right wheel drive shaft due to rotation of the cage. On the other hand, the additional torque is directly supplied to that one of these left and right wheel drive shafts, to which the planetary gear is coupled in the second torque flow path. As a result, this one wheel drive shaft (e.g. the left wheel drive shaft) obtains more additional torque via the first and second torque flow paths, than the other wheel drive shaft (e.g. the right wheel drive shaft) that receives additional torque only via the first torque flow path.

At the same time, the traction motor can deliver a traction torque to the cage. This traction torque is delivered uniformly to the left and right wheel drive shaft, due to rotation of the cage (to simplify this explanation, the internal components of the differential gear are considered standing still, e.g. the vehicle goes in a straight direction). Depending on the control of the torque vectoring motor, the additional torque can be positive or negative with regard to the traction torque delivered by the traction motor to the cage. This means in a superposition of said traction torque and additional torque, the additional torque can enhance or lower an overall torque received by the respective left or right wheel drive shaft. Accordingly, there is a relative difference in the magnitude of the effect, the additional torque supplied by the torque vectoring motor has on the left and right wheel drive shaft. Based on this principle, the overall torque in the left and right wheel drive shaft can be influenced according to the requirements of the driving situation by appropriate control of the torque vectoring motor.

Beneficially, the torque vectoring device or the drive axle of the invention does not require any mechanically switchable couplings in order to achieve the torque vectoring function. This leads to a significantly decreased technical complexity and a high robustness. By use of the layshaft, which means a shaft locally engaging with the cage on the circumference of the cage, the axial length of the torque vectoring device is kept short. Only one planetary gear and layshaft are required for the drive axle of the invention, which contributes to the compact and robust design described above. Overall, this leads to decreased costs of the drive axle of the invention, to low technical effort and low assembly space requirements, as well as savings in physical structure and weight.

Generally, all the addressed components kinematically interacting with each other, such as the traction motor, the differential gear, the torque vectoring motor, the planetary gear, the layshaft and the wheel drive shafts, can be coupled directly or indirectly to each other. Based on this disclosure, a person skilled in the art is enabled to decide on an adequate design in detail, for example depending on desired gear ratios, motor specifications and so on.

If components are coupled indirectly to each other, this can be done via an addition gear element, for instance, to form a gear connection. Therein, an additional step-up or step-down gear stage may be implied, for example with respect to the motors used, to a load capability of the planetary gear and to the desired overall torque in the wheel drive shafts.

In case of direct coupling, there can be a stiff or elastic fixed connection. Further in case of a direct coupling, two components can be directly coupled to each other by forming a gear connection with each other. Just as an example, a gear can be integrally manufactured on an interface part of the planetary gear, the layshaft or other components.

Preferably, the traction motor is coupled directly to the cage, in other words, acts on the cage as a direct drive. Preferably, the drive axle and its different gears and couplings are generally designed so as to allow for the torque vectoring motor standing still, if the vehicle is in a straight forward driving mode, unless the torque vectoring motor is operated for torque vectoring by a controller.

In a preferred embodiment of the drive axle of the invention, the planetary gear is arranged concentric with said wheel drive shafts.

This is advantageous with regard to the lateral assembly space of the drive axle, which can be reduced thereby. At the same time, the overall stiffness of the drive axle is increased, whereas the technical complexity to supply mechanical bearings is reduced and the accuracy of relative positioning of the components of the drive axle is increased. Thereby, frictional effects and energy losses are decreased, which enhances efficiency in supply of the additional torque from the torque vectoring motor.

In an alternatively preferred embodiment of the drive axle of the invention, the planetary gear is axially arranged off said wheel drive shafts.

This embodiment is advantageous with regard to the axial assembly space of the torque vectoring device, which can be reduced thereby. Further, lateral space is available to couple the planetary gear to one of the wheel drive shafts via an appropriate gear connection. Thus, the additional torque supplied by the torque vectoring motor can be amplified and it is possible to expose the planetary gear to a lower torque level and reduce the size of the torque vectoring motor.

These two alternative embodiments underline a high design flexibility of the inventive drive axle with regard to allocation of assembly space, still maintaining a positive impact on dimensioning of the torque vectoring motor and the planetary gear. In the following, different options to embody the inventive drive axle are described in more detail, further underlining a high degree of design flexibility.

In a preferred embodiment of the drive axle of the invention, the torque vectoring motor is coupled to a sun gear of the planetary gear, while said one left or right wheel drive shaft is coupled to a planet carrier and the layshaft is coupled to a ring gear of the planetary gear.

Coupling the planet carrier to the wheel drive shaft allows for realization of a high gear ration from the planetary gear to the wheel drive shaft. Thus, the size of the torque vectoring motor can be reduced.

In another preferred embodiment of the drive axle of the invention, the torque vectoring motor is coupled to a sun gear of the planetary gear, while said one left or right wheel drive shaft is coupled to a ring gear and the layshaft is coupled to a planet carrier of the planetary gear.

This leads to a very compact design and at the same time, the stiffness of the planetary gear and the wheel drive shaft as an assembly is increased. Further, if a disc-type of ring gear is used, dust and other environmental influences can be prevented from entering the planetary gear from that side. All these aspects maintain and enhance the efficiency of the planetary gear, which is positive to lower the load required on the torque vectoring motor.

In another preferred embodiment of the drive axle of the invention, the torque vectoring motor is coupled to a sun gear of the planetary gear, while said one left or right wheel drive shaft is coupled to a ring gear and the layshaft is coupled to a planet carrier of the planetary gear.

Due to this arrangement, the planetary gear is securely rested on the wheel drive shaft and the cage via the layshaft. Especially in off-axis arrangements, this increases the accuracy of relative positioning of the respective components.

In another preferred embodiment of the drive axle of the invention, the layshaft is integrally formed by the planet carrier.

This is very beneficial as it saves on physical structure and makes the system even more compact and stiff.

In another preferred embodiment of the drive axle of the invention, the differential gear comprises a spur gear differential or a bevel gear differential, which offers various design options to connect the differential gear to the other components.

In another preferred embodiment of the drive axle of the invention, the differential gear comprises a spur gear differential and the planet carrier of the planetary gear is coupled to a planet spur gear of said spur gear differential.

The additional torque is thereby delivered to the one left or right wheel drive shaft via the planet spur gear being integrated in the second torque flow path. This can be advantageously used to amplify the additional torque supplied by the torque vectoring motor. This motor can therefore be reduced in size. If it is referred to a reduced size of the torque vectoring motor herein, this preferably refers to said motor that can be dimensioned based on a lower nominal torque than without amplification of said additional torque.

Preferably, the planet spur gear extends out of the cage. Thus, the number of parts required is reduced. However, there could also be an additional gear shaft between the planet carrier and the planet spur gear.

In another preferred embodiment of the drive axle of the invention, the torque vectoring motor and/or the traction motor are arranged concentric with the wheel drive shafts.

This is particularly beneficial to shorten the lateral assembly space and reduce the number of gear connections required.

To further enhance this effect, the torque vectoring motor is preferably arranged concentric with the wheel drive shafts in those embodiments, wherein the planetary gear is also arranged concentric with the wheel drive shafts. It is generally preferred to arrange the traction motor concentric with the wheel drive shafts.

Another aspect of the invention refers to a vehicle, comprising at least one inventive drive axle according to the foregoing description.

Unless indicated otherwise, all embodiments described herein are compatible with each other and the beneficial technical effects apply respectively.

BRIEF DESCRIPTION OF THE DRAWINGS

The invention will be described in further detail below with reference to the accompanying drawings, in which.

DETAILED DESCRIPTION

Figure 1:
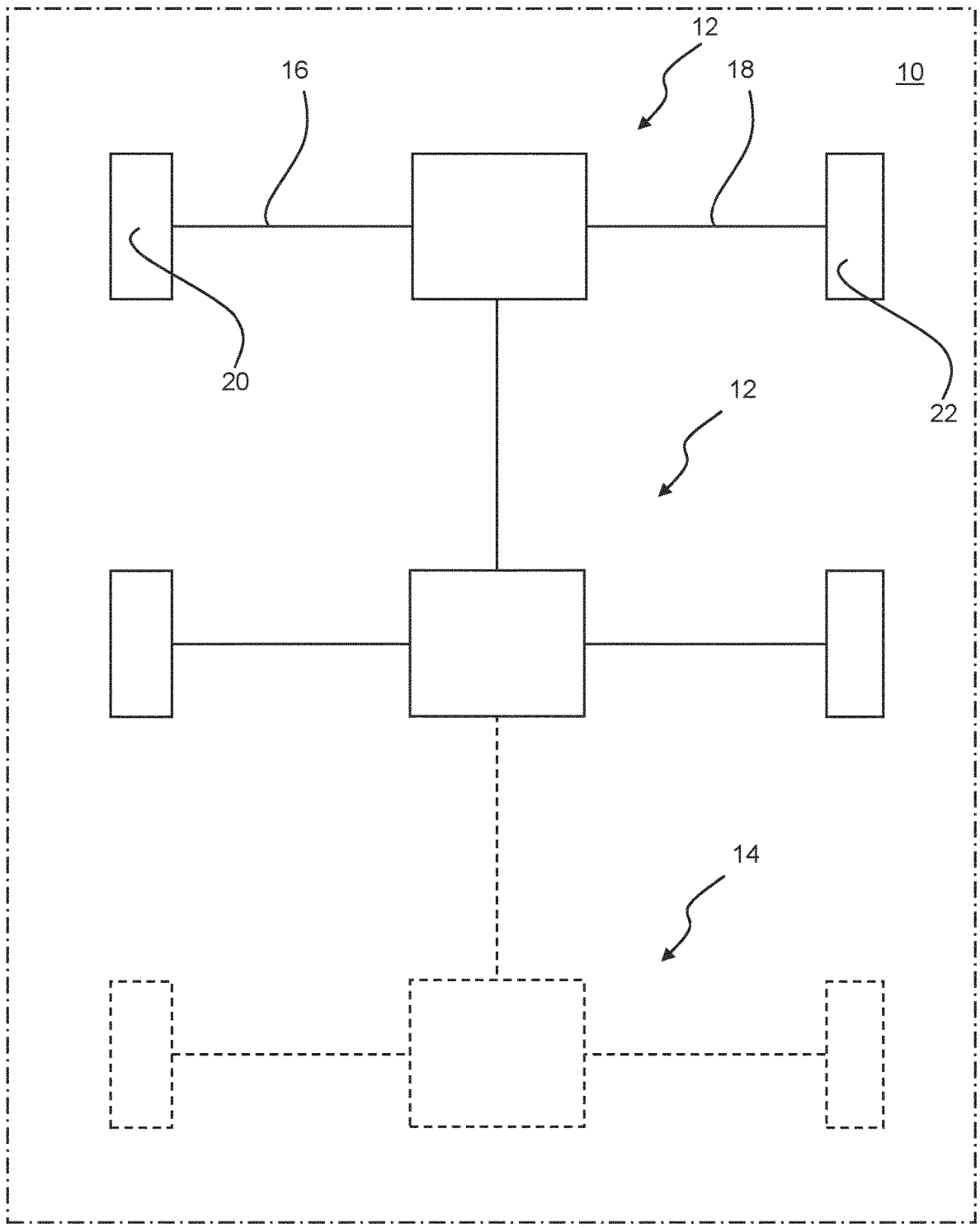
FIG. 1 is a schematic view of an embodiment of a vehicle.

Starting with FIG. 1, a schematic view of an embodiment of an inventive vehicle 10 is illustrated. Said vehicle 10 can have one or more drive axles 12 being provided with a torque vectoring device according to the invention. However, optionally there may be one or more drive axles 14 of a different type in addition, for example driven by a combustion engine. The arrangement of the inventive drive axle(s) 12 and optional drive axle(s) 14 can be freely chosen. The drive axle 12 has a left wheel drive shaft 16 and a right wheel drive shaft 18. For use in the vehicle 10, one or more wheels can be applied to the left wheel drive shaft 16 and a right wheel drive shaft 18, that are referred to as a left wheel 20 and a right wheel 22, respectively.

Figure 2:
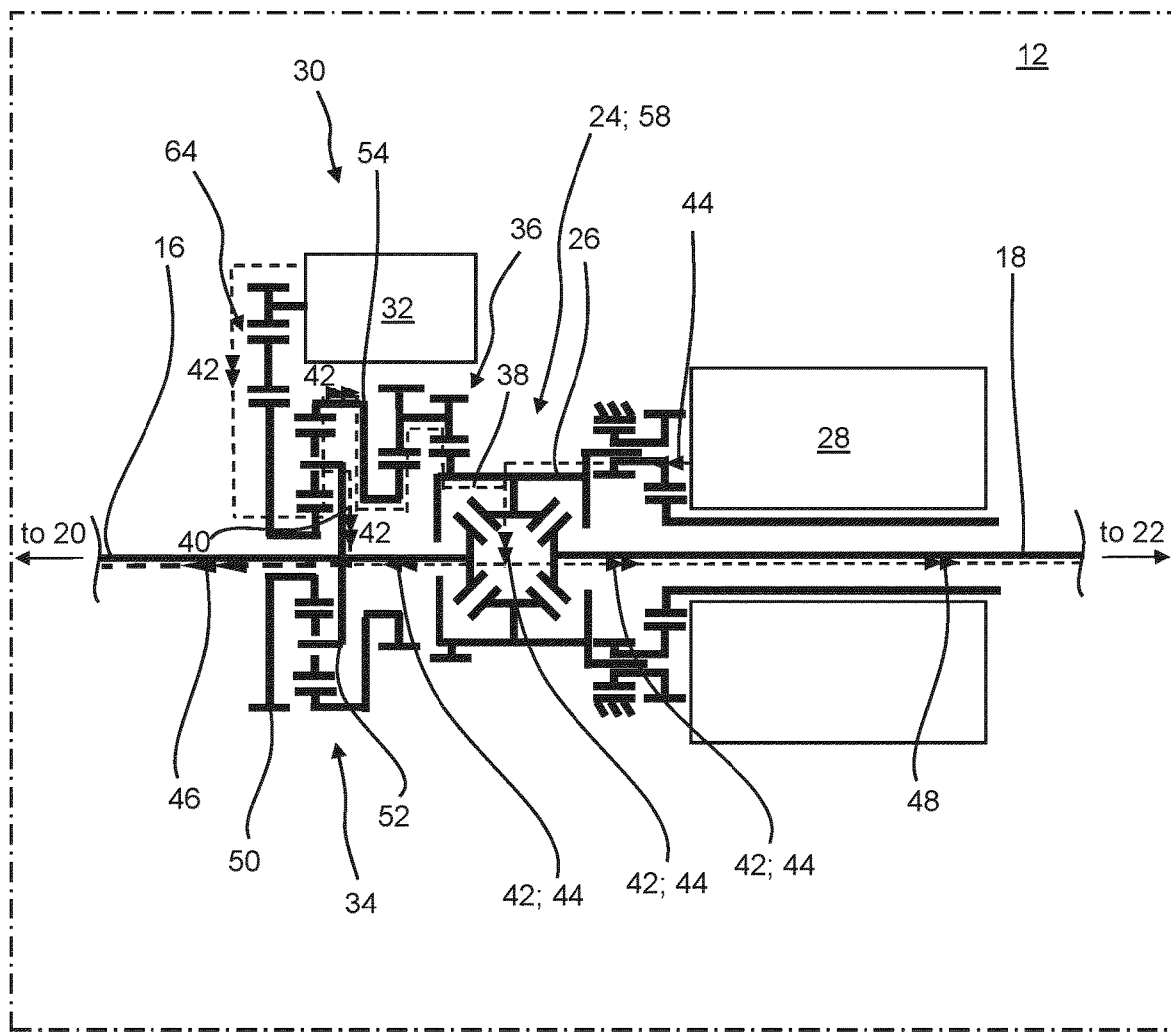
FIG. 2-7 are schematic views of embodiments of a drive axle.

In FIG. 2, common features of all embodiments of the inventive torque vectoring device and/or drive axle 12 for the vehicle 10 are described and a specific embodiment is schematically illustrated. The drive axle 12 comprises a differential gear 24 with a cage 26. Further, the drive axle 12 comprises an electric traction motor 28 coupled to said cage 26. The left wheel drive shaft 16 and the right wheel drive shaft 18 extend from said differential gear 24. The wheel drive shafts 16, 18 are also considered the axis of rotational symmetry, with respect to those components illustrated symmetrical with regard to the wheel drive shafts 16, 18.

The drive axle 12 further comprises a torque vectoring device 30 with an electric torque vectoring motor 32, a planetary gear 34 and a layshaft 36.

The planetary gear 34 is coupled to one of said wheel drive shafts 16, 18. In this illustration, just as an example, it is coupled to the left wheel drive shaft 16. However, it is clear, that "left" or "right" refers to an orientation, in which the drive axle 12 is assembled in the vehicle 10.

Further, the layshaft 36 is coupled to the cage 26. Based on the described arrangements, the torque vectoring motor 32 is forming a first torque flow path 38 with the planetary gear 34, the layshaft 36 and the cage 26 and a second torque flow path 40 with said planetary gear 34 and the left wheel drive shaft 16. As can be seen in FIG. 2, the first torque flow path 38 and the second torque flow path 40 are kinematically arranged in parallel.

If additional torque 42 is to be supplied by the torque vectoring motor 32, it is passed on via the first torque flow path 38 to the cage 26 and via the second torque flow path 40 to the left wheel drive shaft 16.

At the same time, the traction motor 28 can deliver a traction torque 44 to the cage 26. This traction torque 44 is superimposed with the additional torque 42 in the differential gear 24 and both are delivered to the left and right wheel drive shaft 16, 18 due to rotation of the cage 26.

At the same time, the additional torque 42 is directly supplied to the left wheel drive shaft 16, to which the planetary gear 34 is coupled, in the second torque flow path 40. As a result, the left wheel drive shaft 16 obtains more additional torque 42 (which can be positive or negative with regard to the traction torque 44) via both, the first and second torque flow path 38, 40, than the right wheel drive shaft 18 that only receives additional torque 42 via the first torque flow path 38.

This means an overall torque 46 in the left wheel drive shaft 16 is a superposition of said traction torque 44, said additional torque 42 via the first torque flow path 38 and said additional torque 42 via the second torque flow path 40, whereas an overall torque 48 in the right wheel drive shaft 18 is a superposition of only said traction torque 44 and said additional torque 42 supplied via the first torque flow path 38.

Accordingly, the additional torque 42 delivered by the torque vectoring motor 32 has a stronger influence on the overall torque 46 in the left wheel drive shaft 16 than in the right wheel drive shaft 18. This stronger influence is illustrated by thick arrows and a thick torque flow path line at reference sign 46. Thus, the overall torques 46 and 48 in the left and right wheel drive shafts 16, 18 can be influenced relatively to each other, according to the requirements of the driving situation and by appropriate control of the torque vectoring motor 32 (the controller is not shown here).

Merely for simpler illustration, the torque flow lines of the first and second torque flow paths 38, 40 are only illustrated in the upper part of the figure, with regard to the axis of rotational symmetry.

The essential principles described above apply to all embodiments of the drive axle 12 of the invention, despite the physical structure having some specific differences in the different embodiments. Therefore, the above description applies to the other figures, as well, with regard to these principles.

Now turning to the specific aspects of the embodiment shown in FIG. 2, the planetary gear 34 is arranged concentric with the wheel drive shafts 16, 18.

The torque vectoring motor 32 is coupled to an input in the form of a sun gear 50 of the planetary gear 34 via a gear connection 64, while the left wheel drive shaft 16 is coupled to a planet carrier 52 of the planetary gear 34, forming a first output of the planetary gear 34. The layshaft 36, which is arranged eccentric with the planetary gear 34 such that it is arranged off-axis, is coupled to a ring gear 54 of the planetary gear 34, forming a second output of the planetary gear 34.

Figure 5:
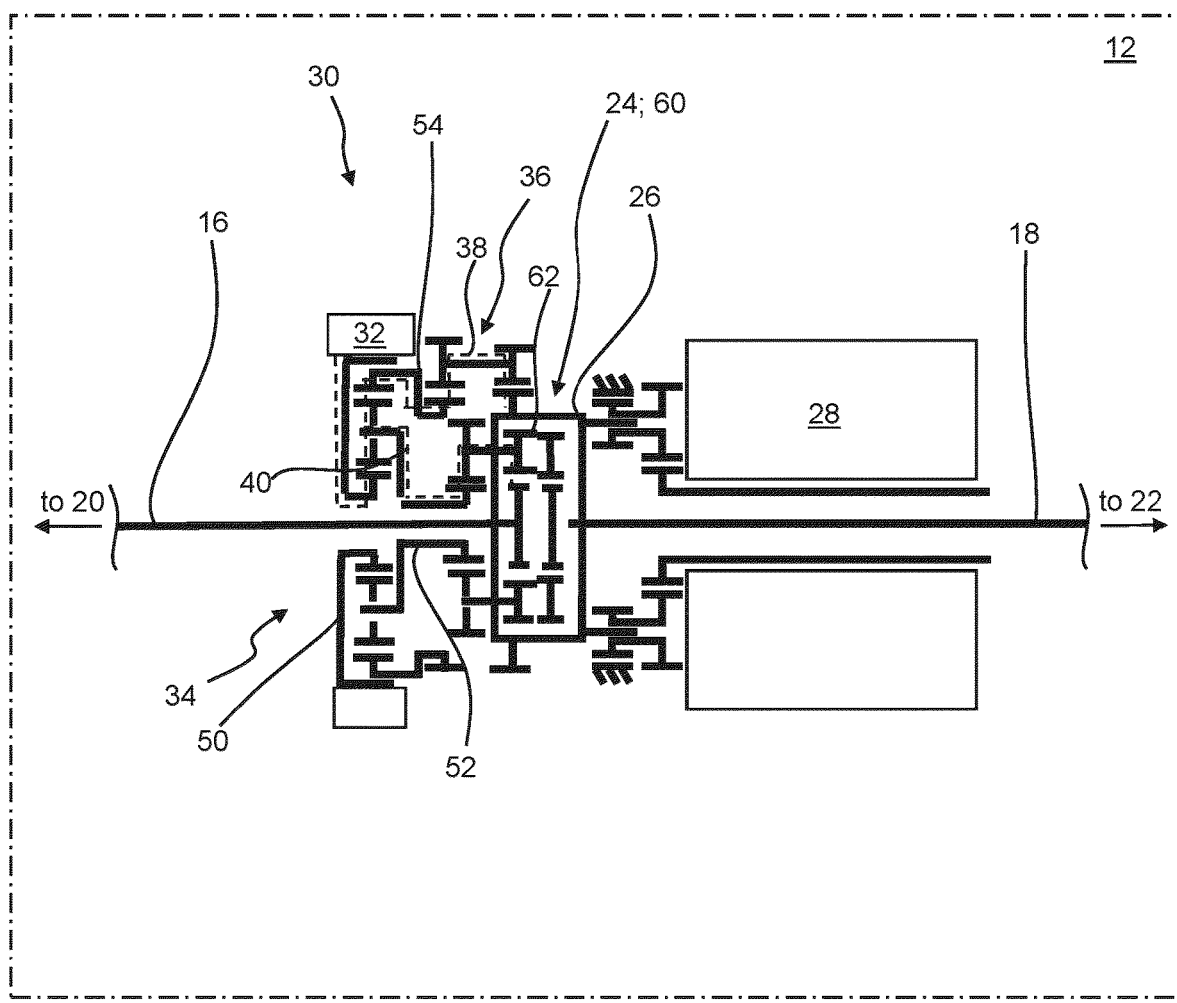
Figure 6:
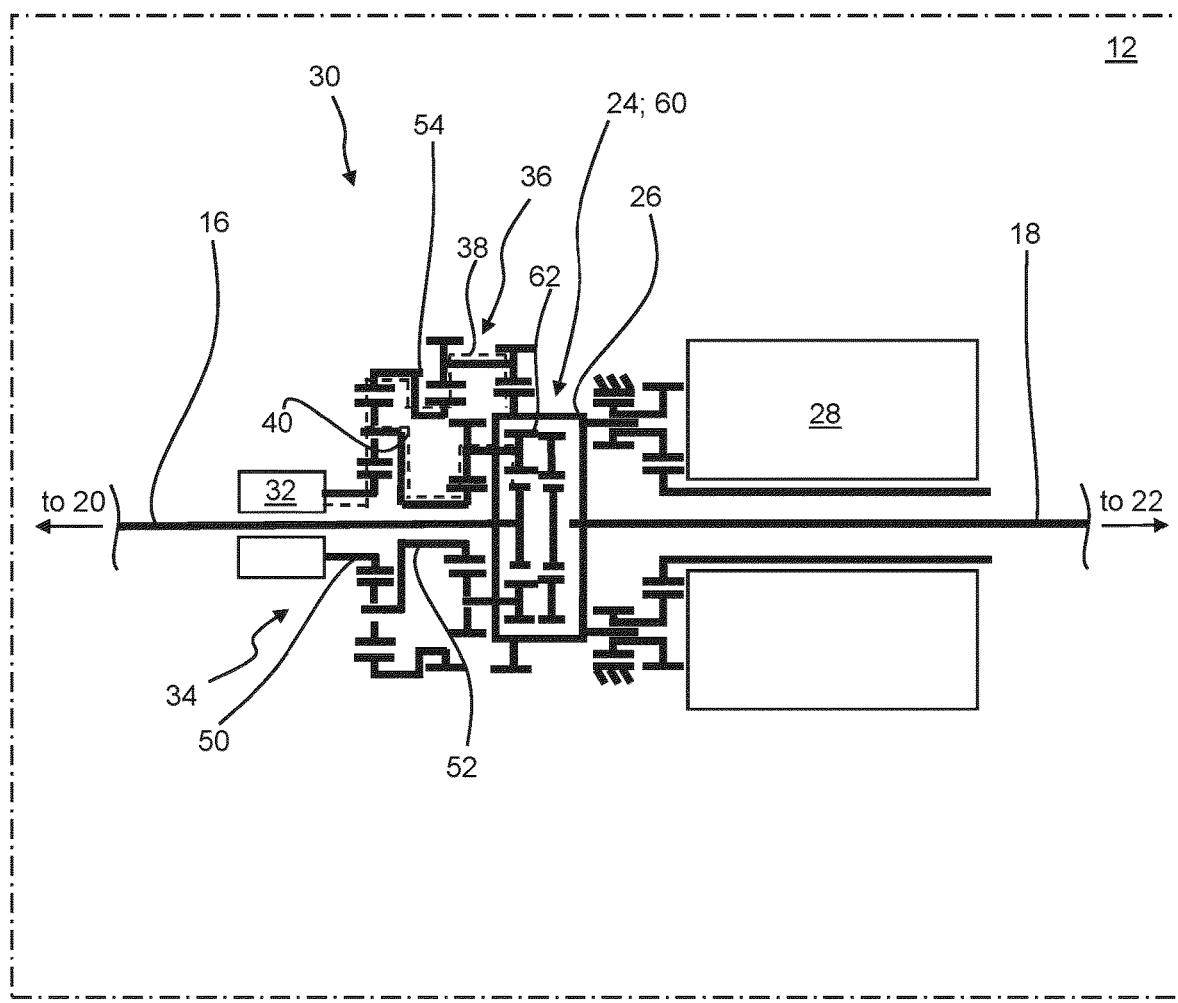

In this example, the differential gear 24 comprises a bevel gear differential 58, however, it could also comprise a spur gear differential 60 (see FIGS. 5 and 6). Further, the torque vectoring motor 32 is arranged off-axis with regard to the wheel drive shafts 16, 18, while the traction motor 28 is arranged concentric with those.

Figure 3:
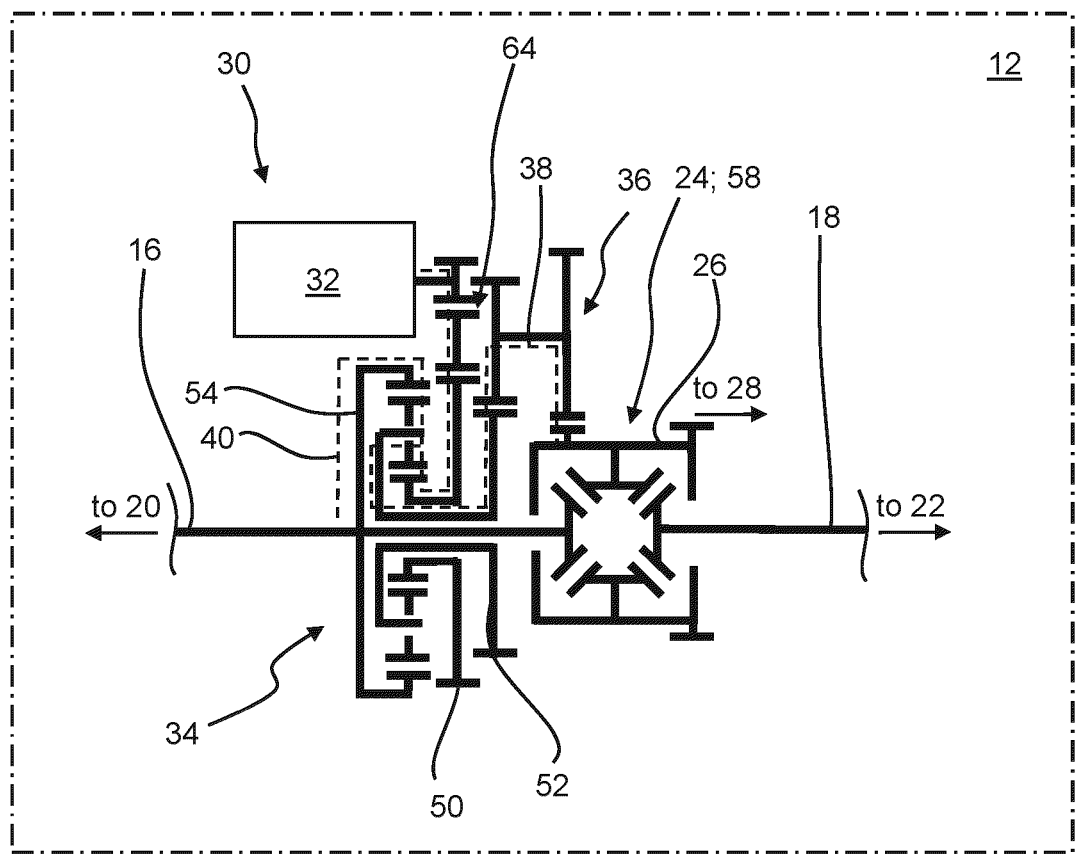

Now turning to FIG. 3, another embodiment of the inventive drive axle 12 is schematically illustrated in a simplified manner, focussing on the specific aspects of this embodiment.

Herein, the planetary gear 34 again is arranged concentric with the wheel drive shafts 16, 18 while the layshaft 36 is arranged off-axis, or eccentric with the planetary gear 34. The torque vectoring motor 32 is coupled to the sun gear 50 via a gear connection 64 and is forming the second torque flow path 40 with the planetary gear 34 and the left wheel drive shaft 16 via the ring gear 54, which in this embodiment forms the first output of the planetary gear 34. The left wheel drive shaft 16 is therefore coupled to the ring gear 54 of the planetary gear 34. The first torque flow path 38 is formed by the torque vectoring motor 32 via the sun gear 50, the planet carrier 52 and the layshaft 36 being coupled to the planet carrier 52 of the planetary gear 34. Hence, here the planet carrier 52 forms the second output of the planetary gear 34. In this embodiment, the differential gear 24 comprises a bevel gear differential 58.

Figure 4:
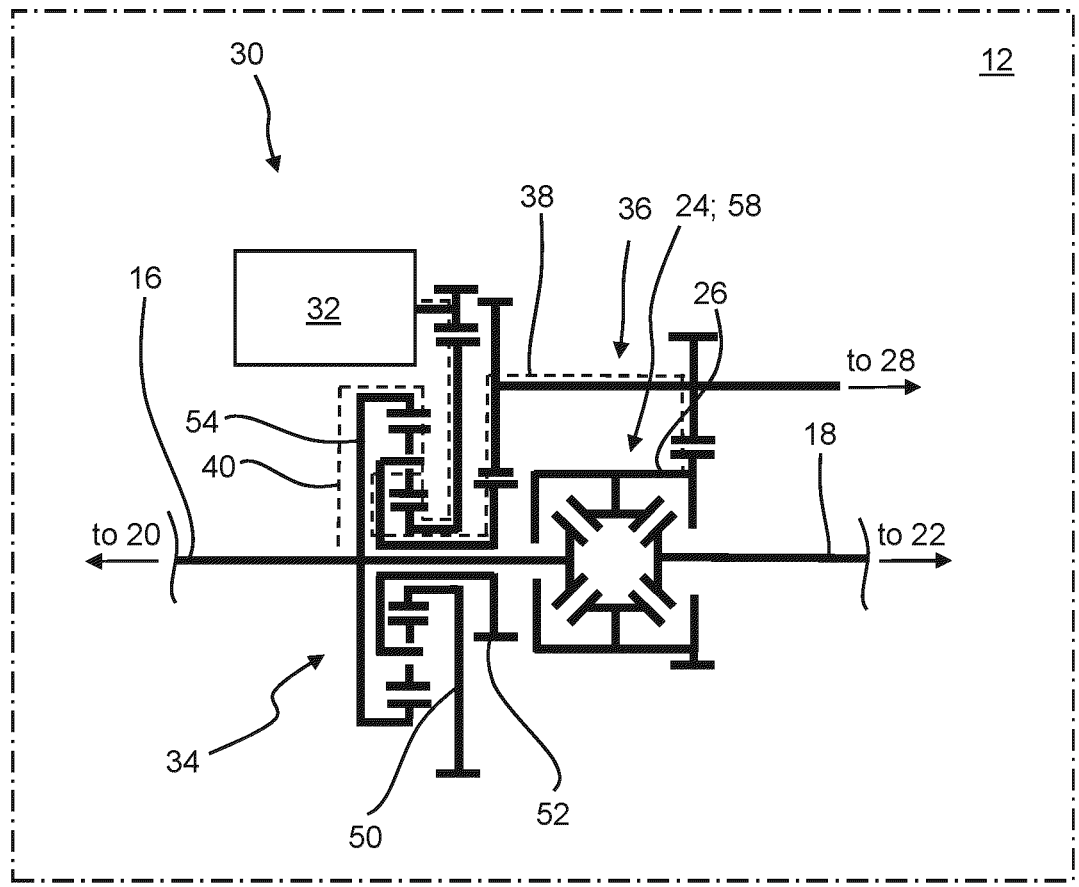

Now turning to FIG. 4, another embodiment of the inventive drive axle 12 is schematically illustrated in a simplified manner, focussing on the specific aspects of this embodiment.

Again, the planetary gear 34 is arranged concentric with the wheel drive shafts 16, 18 while the layshaft 36 is arranged eccentric with the planetary gear 34. The torque vectoring motor 32 is forming the second torque flow path 40 with the planetary gear 34 and the left wheel drive shaft 16 via the ring gear 54. The torque vectoring motor 32 is coupled to the sun gear 50. The left wheel drive shaft 16 is further coupled to the ring gear 54 of the planetary gear 34 which forms the first output of the planetary gear 34. The layshaft 36 is coupled to the planet carrier 52 of the planetary gear 34 which forms the second output of the planetary gear 34. The first torque flow path 38 is thus formed via the sun gear 50, the planet carrier 52 and the layshaft 36. The differential gear 24 comprises a bevel gear differential 58. In this embodiment, the electric traction motor 28 is coupled to the cage 26 via said layshaft 36.

Now turning to FIG. 5, the specific aspects of this embodiment again comprise, that the planetary gear 34 is arranged concentric with the wheel drive shafts 16, 18 while the layshaft 36 is axially offset from the planetary gear 34. The torque vectoring motor 32 is coupled to the sun gear 50 of the planetary gear 34 and is arranged concentric with the planetary gear 34. In this embodiment, this is done in a manner that the torque vectoring motor 32 is arranged at an outer circumference of the sun gear 50. The traction motor 28 is arranged concentric with the wheel drive shafts 16, 18, as well.

In this example, the differential gear 24 comprises a spur gear differential 60. The left wheel drive shaft 16 is indirectly coupled to the planet carrier 52 of the planetary gear 34, forming the first output of the planetary gear 34, via a planet spur gear 62 of said spur gear differential 60. Said planet spur gear 62 extends out of the cage 26 and engages with the planet carrier 52. The layshaft 36 is coupled to the ring gear 54 of the planetary gear 34, which forms the second output of the planetary gear 34.

In this arrangement, the first torque flow path 38 is formed via the sun gear 50, the ring gear 54 and the layshaft 36. The second torque flow path 40 is formed via the sun gear 50, the planet carrier 52, and the planet spur gear 62.

Now turning to FIG. 6, one embodiment is described very similar to that of FIG. 5. Accordingly, only the difference will be highlighted and it is referred to FIG. 5 for other specific details.

As shown in FIG. 6, the torque vectoring motor 32 is again coupled to the sun gear 50 of the planetary gear 34 and is arranged concentric with the planetary gear 34. However, in this case the torque vectoring motor 32 is arranged in front of the planetary gear 34, still concentric with the wheel drive shafts 16, 18.

Figure 7:
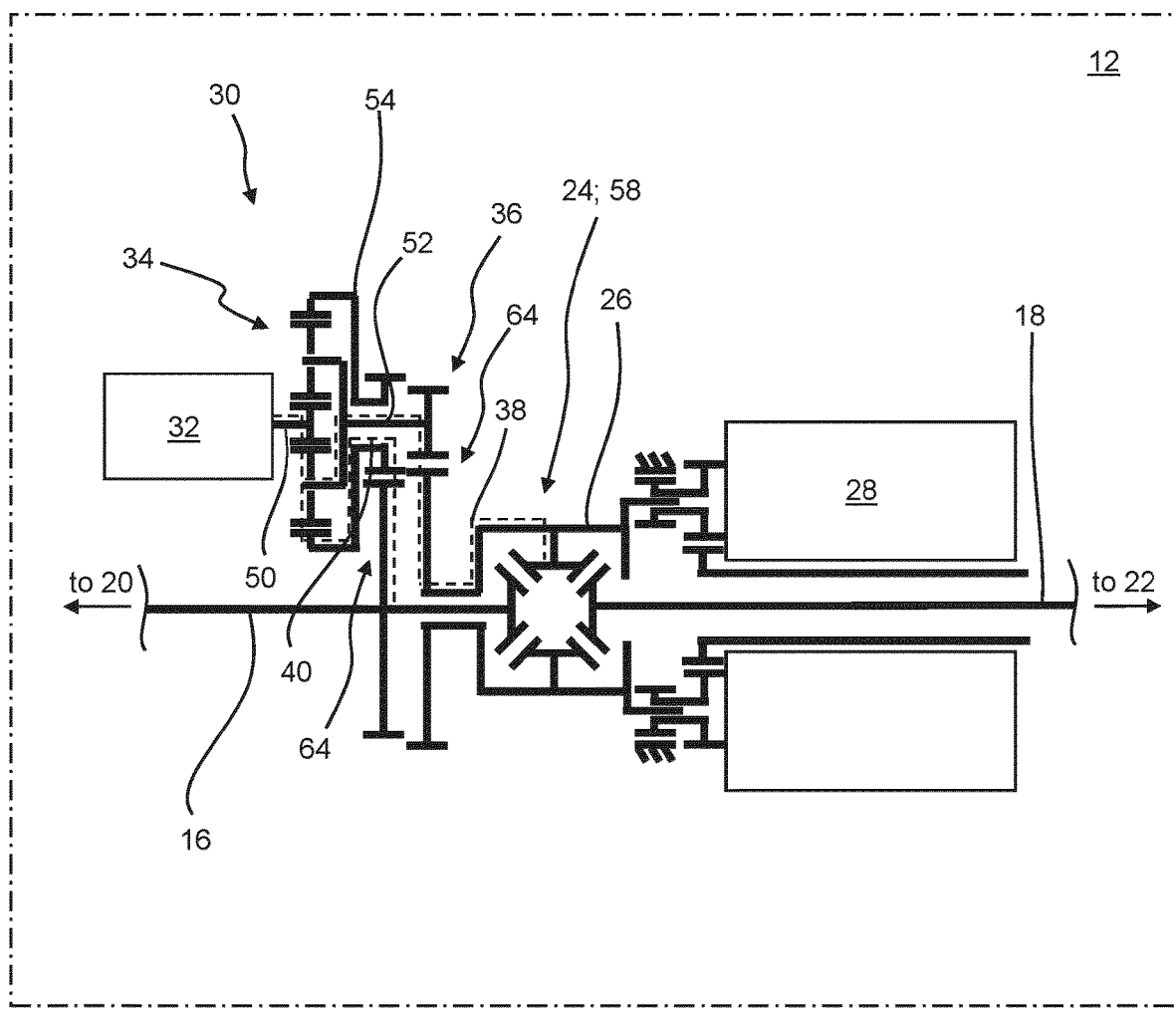

Now turning to FIG. 7, an embodiment is shown, wherein the planetary gear 34 is arranged axially off the left and right wheel drive shafts 16, 18. The torque vectoring motor 32 is coupled to the sun gear 50 of the planetary gear 34. The left wheel drive shaft 16 is coupled to the ring gear 54 of the planetary gear 34 by means of a gear connection 64, that can be integrated in these components.

The layshaft 36 is part of the planet carrier 52 in this embodiment and can be integrally formed by the planet carrier 52. The layshaft 36 engages with the cage 26, that has a counter-part to form a gear connection 64 with the layshaft 36. The counter-part can be integrally formed by the cage 26, as well.

In this arrangement, the first torque flow path 38 is formed via the sun gear 50, the planet carrier 52 and the layshaft 36 (which can be the planet carrier 52). The second torque flow path 40 is formed via the sun gear 50, the ring gear 54, and the gear connection 64.

In this example, the differential gear 24 comprises a bevel gear differential 58, however, it could also comprise a spur gear differential 60 (see FIGS. 5 and 6). Further, the torque vectoring motor 32 is arranged off-axis with regard to the wheel drive shafts 16, 18, while the traction motor 28 is arranged concentric with those.

For all embodiments described herein the layshaft 36 is preferably configured to i) bridge the axial distance between the planetary gear 34 and the differential gear 24, and ii) provide a gear change of the second output of the planetary gear 34.

The invention claimed is:

1. A torque vectoring device for a drive axle of a vehicle, said torque vectoring device comprising an electric torque vectoring motor, a planetary gear, and a layshaft coupled to a cage of a differential gear at a position radially outside and adjacent to a circumference of the cage, said planetary gear comprising a first output being configured to be coupled to one of a left or right wheel drive shaft and a second output being coupled to said layshaft, wherein said torque vectoring motor forms a first torque flow path with said planetary gear and said layshaft and a second torque flow path with the first output of said planetary gear, wherein the layshaft is arranged eccentric with the first output of the planetary gear.

2. The torque vectoring device according to claim 1, wherein the planetary gear is arranged concentric with said wheel drive shafts.

3. The torque vectoring device according to claim 2, wherein the layshaft is axially arranged off said wheel drive shafts.

4. The torque vectoring device according to claim 3, wherein the torque vectoring motor is coupled to a sun gear of the planetary gear, while a ring gear is configured to be coupled to said left or right wheel drive shaft, and the layshaft is coupled to a planet carrier of the planetary gear.

5. The torque vectoring device according to claim 1, wherein the torque vectoring motor is coupled to a sun gear of the planetary gear, while a planet carrier is configured to be coupled to said left or right wheel drive shaft, and the layshaft is coupled to a ring gear of the planetary gear.

6. A drive axle for a vehicle, comprising the torque vectoring device according to claim 1, the differential gear with the cage, the left wheel drive shaft, and the right wheel drive shaft extending from said differential gear.

7. The drive axle according to claim 6, wherein the differential gear comprises a spur gear differential or a bevel gear differential.

8. The drive axle according to claim 7, wherein the differential gear comprises a spur gear differential and a planet carrier, forming the first output of the planetary gear, is coupled to a planet spur gear of said spur gear differential.

9. The drive axle according to claim 8, further comprising an electric traction motor coupled to the cage of the differential gear, wherein the torque vectoring motor and/or the electric traction motor are arranged concentric with the wheel drive shafts.

10. A vehicle, comprising at least one drive axle according to claim 6.

11. The drive axle according to claim 6, wherein the differential gear comprises a spur gear differential and a planet carrier, forming the first output of the planetary gear, is coupled to a planet spur gear of said spur gear differential.

12. The drive axle according to claim 6, further comprising an electric traction motor coupled to the cage of the differential gear, wherein the torque vectoring motor and/or the electric traction motor are arranged concentric with the wheel drive shafts.

13. The torque vectoring device according to claim 1, wherein the layshaft is axially arranged off said wheel drive shafts.

14. The torque vectoring device according to claim 1, wherein the torque vectoring motor is coupled to a sun gear of the planetary gear, while a ring gear is configured to be coupled to said left or right wheel drive shaft, and the layshaft is coupled to a planet carrier of the planetary gear.

15. The torque vectoring device according to claim 1, wherein the layshaft engages directly with the cage on the circumference of the cage.

16. The torque vectoring device according to claim 1, wherein the differential gear extends an axial distance along an axis of at least one of the left or right wheel drive shafts, wherein the layshaft is positioned at least partially within the axial distance.

* * * * *